P. H. Stauffer.
Manure Fork.
No. 86110. Patented Jan. 19. 1869.
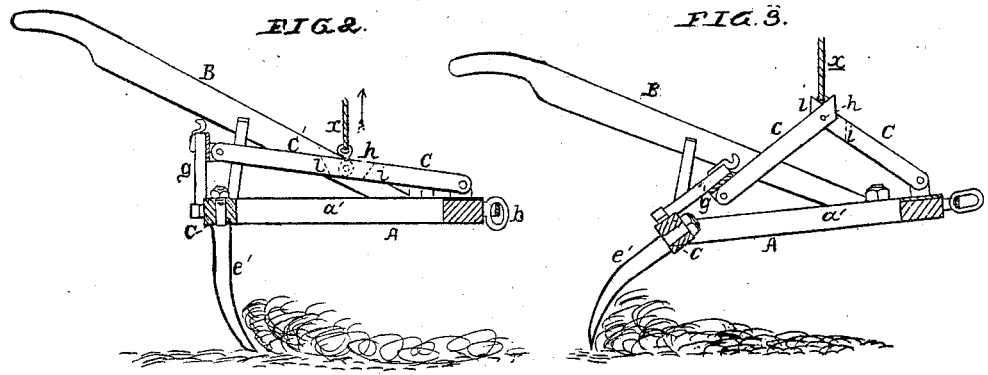
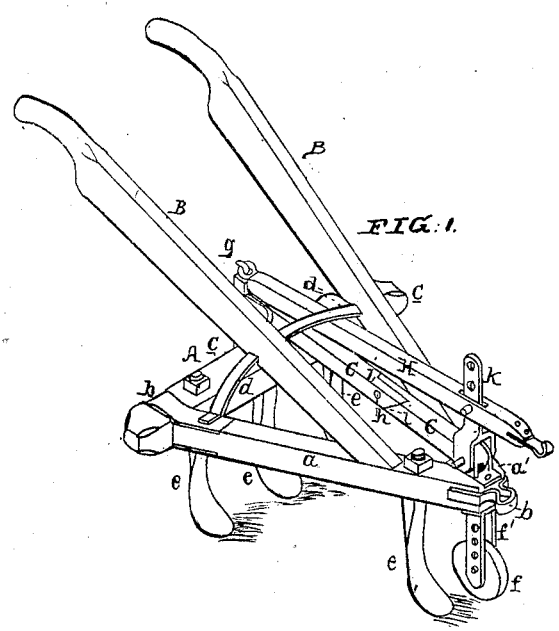
Witnesses: John Parker, Thos. McIlwain
P. H. Stauffer
By his Atty
H. Houston

United States Patent Office.

P. H. STAUFFER, OF LEHIGHTON, PENNSYLVANIA, ASSIGNOR TO HIMSELF, EDWARD MAURY, AND WILLIAM L. LANDS.

Letters Patent No. 86,110, dated January 19, 1869.

IMPROVEMENT IN COMBINED CULTIVATOR AND MANURE-DRAG.

The Schedule referred to in these Letters Patent and making part of the same.

*To all whom it may concern:*

Be it known that I, P. H. STAUFFER, of Lehighton, Carbon county, Pennsylvania, have invented a Combined Cultivator and Manure-Drag; and I do hereby declare the following to be a full, clear, and exact description of the same.

My invention consists of an implement constructed, arranged, and operating substantially as described hereafter, so that it may be used either as an ordinary cultivator or for dragging manure.

In order to enable others skilled in the art to make and apply my invention, I will now proceed to describe its construction and operation, reference being had to the accompanying drawing, which forms a part of this specification, and in which—

Figure 1 is a perspective view of my combined cultivator and manure-drag, and

Figures 2 and 3, sectional views of the same in different positions, when in use as a manure-drag.

The triangular frame A of the cultivator, in fig. 1, consists of two bars $a$ and $a'$, connected together at the front end, where there are a strap and ring, $b$, and of a transverse bar, $c$, which connects together the rear ends of the bars $a$, and is arranged to turn in straps or bearings $b'$, secured to the same.

Two handles B B, which are connected together, and suitably braced by a bent rod, $d$, are secured to the frame A, and at the under side of the latter are the usual hoe-shaped teeth $e$, two of which are, in the present instance, secured to the bars $a$, and three to the cross-bar $c$; and at the front end of the frame is a wheel, $f$, the axis of which can be raised or lowered, and arranged to turn in any of the holes of a hanger, $f'$.

C and C' are two rods, one of which is hung to the front of the frame A, and the other to an arm, $g$, which projects upwards from the centre of the cross-bar $c$, the outer ends of the two rods fitting together, and being connected by a pin, $h$.

The joint between these rods is, owing to their inclined ends and shoulders $i$, of such a character as to prevent them from being turned downwards below a horizontal line, or from being raised, unless by a direct pull in the direction of the arrow, fig. 2, the rods consequently locking the cross-bar $c$ of the frame, and preventing it from being turned in its bearings $b'$.

The horse, or team of horses by which the cultivator is drawn forward, is attached to a hook at the front end of a bar, H, which is itself hooked to the arm $g$, and raised or lowered, as required, on a vertical rod, $k$.

When the implement is to be used for dragging manure, the cultivator-teeth are unbolted from the frame, and replaced by the square-pointed teeth $e'$, shown in figs. 2 and 3, the bar H being also removed, and the horse attached to the ring $b$ at the front of the frame.

When a sufficient quantity of manure has been accumulated before the rear teeth of the drag, the rods C and C' are raised slightly by an arm or cord, $x$, attached to the pin $h$. As soon as the rods are thus raised or unlocked, their resistance to the motion of the cross-bar $e$ ceases, and the latter, by reason of the mass of manure bearing against its teeth, turns to the position shown in fig. 3, and permits the escape of the mass.

The rods C are then depressed, and the cross-bar and its teeth brought to their former position, after which the operation proceeds as at first; and a second mass is collected and discharged in the same manner.

I claim as my invention, and desire to secure by Letters Patent—

The combination of the frame A, its detachable teeth $e\ e'$, the bar H, and rods $c\ c'$, the whole being arranged and operating substantially as and for the purpose herein set forth.

In testimony whereof, I have signed my name to this specification, in the presence of two subscribing witnesses.

P. H. STAUFFER.

Witnesses:
 H. HOWSON,
 C. B. PRICE.